(12) United States Patent
Yan

(10) Patent No.: US 9,339,883 B2
(45) Date of Patent: May 17, 2016

(54) SOLDERING METHOD

(71) Applicant: Shenzhen Kunqi Xinhua Co., Ltd., Shenzhen (CN)

(72) Inventor: Yongnong Yan, Shenzhen (CN)

(73) Assignee: SHENZHEN KUNQI XINHUA CO., LTD., Shenzhen (CN)

( * ) Notice: Subject to any disclaimer, the term of this patent is extended or adjusted under 35 U.S.C. 154(b) by 0 days.

(21) Appl. No.: 14/583,183

(22) Filed: Dec. 25, 2014

(65) Prior Publication Data

US 2015/0108205 A1 Apr. 23, 2015

Related U.S. Application Data

(63) Continuation-in-part of application No. PCT/CN2013/075998, filed on May 21, 2013.

(30) Foreign Application Priority Data

Jun. 26, 2012 (CN) .......................... 2012 1 0211642

(51) Int. Cl.
  *B23K 31/02* (2006.01)
  *B23K 1/08* (2006.01)
  *B23K 1/20* (2006.01)

(52) U.S. Cl.
  CPC . *B23K 1/08* (2013.01); *B23K 1/203* (2013.01); *B23K 1/085* (2013.01)

(58) Field of Classification Search
  None
  See application file for complete search history.

(56) References Cited

U.S. PATENT DOCUMENTS

| | | | | | |
|---|---|---|---|---|---|
| 3,218,193 | A | * | 11/1965 | Isaacson | B23K 3/082 118/429 |
| 3,445,919 | A | * | 5/1969 | Saba | B23K 1/085 228/179.1 |
| 4,016,394 | A | * | 4/1977 | Hecht | B23K 9/0253 219/105 |
| 4,037,774 | A | * | 7/1977 | Barozzi | B23K 1/0002 228/183 |
| 4,153,195 | A | * | 5/1979 | Barozzi | B23K 1/19 228/183 |
| 5,320,274 | A | * | 6/1994 | Precious | B23K 1/008 228/180.1 |
| 5,419,482 | A | * | 5/1995 | Hendrikx | B23K 3/0653 118/410 |
| 5,520,320 | A | * | 5/1996 | McKean | B23K 1/085 228/102 |
| 5,569,075 | A | * | 10/1996 | Leturmy | F27D 7/06 228/219 |
| 5,725,143 | A | * | 3/1998 | Leturmy | B23K 1/085 118/410 |
| 6,116,491 | A | * | 9/2000 | Katoh | B23K 3/0646 228/219 |
| 6,234,380 | B1 | * | 5/2001 | Heine | B23K 1/012 228/180.1 |
| 6,378,753 | B1 | * | 4/2002 | Schellen | B23K 1/008 228/219 |
| 6,464,122 | B1 | * | 10/2002 | Tadauchi | B23K 1/06 228/1.1 |
| 6,942,791 | B1 | * | 9/2005 | Petrov | B23K 1/0016 134/105 |
| 8,875,978 | B2 | * | 11/2014 | Feger | B23K 35/0222 228/13 |
| 2004/0129764 | A1 | * | 7/2004 | Dong | B23K 35/26 228/245 |
| 2005/0230457 | A1 | * | 10/2005 | Kay | C22B 9/10 228/260 |
| 2006/0054668 | A1 | * | 3/2006 | Severin | B23K 31/02 228/260 |
| 2010/0180726 | A1 | | 7/2010 | Yan | |
| 2011/0036628 | A1 | * | 2/2011 | Aihara | B23K 1/0016 174/94 R |
| 2011/0139855 | A1 | * | 6/2011 | Ristolainen | B23K 1/0016 228/102 |
| 2011/0237065 | A1 | * | 9/2011 | Kawashiro | B23K 1/0016 438/615 |
| 2011/0240716 | A1 | * | 10/2011 | Zinn | B23K 1/0008 228/119 |
| 2013/0098974 | A1 | * | 4/2013 | Dong | B23K 1/0016 228/219 |
| 2014/0027495 | A1 | * | 1/2014 | Arslanian | B23K 3/082 228/37 |
| 2015/0209885 | A1 | * | 7/2015 | Zhang | B23K 3/0653 228/219 |

FOREIGN PATENT DOCUMENTS

| | | | | |
|---|---|---|---|---|
| BE | 744863 A1 | * 7/1970 | .......... | B23K 1/0012 |
| CA | WO 9311903 A1 | * 6/1993 | .............. | B05D 1/26 |
| CN | 101215712 A | 7/2008 | | |
| CN | 101532130 A | 9/2009 | | |
| CN | 101837272 A | 9/2010 | | |
| CN | 101838787 A | 9/2010 | | |
| SU | 1639921 A | * 4/1991 | | |
| WO | WO 2006/032006 B2 | * 3/2006 | | |

* cited by examiner

*Primary Examiner* — Kiley Stoner

(74) *Attorney, Agent, or Firm* — Matthias Scholl, PC; Matthias Scholl

(57) ABSTRACT

A welding method, including: forming a molten solder in a solder bath, forming a dynamic flow of the molten solder from the solder bath, and contacting an object to be welded with the dynamic flow of the molten solder and conducting welding. The surface of the molten solder includes a reduction layer. The oxygen content of the molten solder is below 10 ppm.

6 Claims, No Drawings

SOLDERING METHOD

CROSS-REFERENCE TO RELATED APPLICATIONS

This application is a continuation-in-part of International Patent Application No. PCT/CN2013/075998 with an international filing date of May 21, 2013, designating the United States, now pending, and further claims priority benefits to Chinese Patent Application No. 201210211642.7 filed Jun. 26, 2012. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND OF THE INVENTION

1. Field of the Invention

The invention relates to a welding method, and more particularly to a through hole welding method.

2. Description of the Related Art

In industrial production, a metal or an alloy is usually molten to combine with or adhere to another metal. However, most metals, particularly in the molten state, are easily oxidized. In general, a reducing agent is employed to prevent the oxidization of the molten metal, and the reducing agent includes a reduction powder, a reduction metal, and a viscous gel reduction substance. However, the reducing agents have the following defects.

1) The reduction powder is inconvenient for use and easily flies apart, and much smoke is produced, which is difficult to discharge and treat, thereby causing environmental pollution.

2) The reduction metal has high material cost and processing cost; the addition amount of the reduction metal is difficult to control, and the use of an overdose of the metal particle may increase the tension of the molten alloy.

3) The viscous gel reduction substance has low diffusion efficiency thereby requiring laborious stirring, and high viscosity thereby being difficult to clean. The mixture of viscous residues and the molten metal often blocks the technological equipment.

In addition, the molten solder obtained from the above methods has relatively high oxygen content, thereby affecting the welding quality.

SUMMARY OF THE INVENTION

In view of the above-described problems, it is one objective of the invention to provide a welding method that has little dross produced, simple and safe process, and low oxygen content in the molten solder.

To achieve the above objective, in accordance with one embodiment of the invention, there is provided a welding method comprising: forming a molten solder in a solder bath; forming a dynamic flow of the molten solder from the solder bath; and contacting an object to be welded with the dynamic flow of the molten solder and conducting welding. A surface of the molten solder comprises a reduction layer, and an oxygen content of the molten solder is below 10 ppm.

Advantages according to embodiments of the invention are summarized as follows:

A. Simple Process and Easy Operation

In the welding method disclosed in the invention, the reduction layer is the water soluble oily liquid floating on the surface of the molten solder and is capable of taking effect. Accurate control of the amount of the reduction layer is not necessary, thereby being easy to operate.

B. Little Dross Produced

In the above welding method, the reduction layer is adapted to effectively diffuse an internal attraction force of the metal dross, positively disperse the dross structure, and reduce the metal wrapped in the dross and allow the dross to backflow to the solder bath, thereby largely decreasing the yield of the dross.

C. High Welding Quality

During the welding process, free oxygen exists in the molten solder. This part of oxygen has adverse effect on the weldability of the solder and the quality of the formed welding point in the welding process, thereby affecting the welding quality. The method of the invention is capable of effectively decreasing the oxygen content in the molten solder and improving the welding quality.

D. Safety Use

No splashing or gasification of the reduction layer occurs in the welding process using the welding method disclosed in the invention, so that hidden dangers such as fire and explosion in high temperature environment are avoided, thereby largely improving the safety performance of the usage.

DETAILED DESCRIPTION OF THE EMBODIMENTS

For further illustrating the invention, experiments detailing a welding method are described below. It should be noted that the following examples are intended to describe and not to limit the invention.

A welding method comprises: forming a molten solder in a solder bath; forming a dynamic flow of the molten solder from the solder bath; and contacting an object to be welded with the dynamic flow of the molten solder and conducting welding. A surface of the molten solder comprises a reduction layer, and an oxygen content of the molten solder is below 10 ppm.

In the above welding method, the formation of the molten solder in the solder bath is well-known in the technical field, for example, a solid solder is added to the solder bath and heated to be molten. A heating temperature enables the solid solder to be molten. The person skilled in the art can make proper adjustment according to adopted different solid solders so as to achieve the purpose of molting the solid solder.

For the above solid solder, different solders are selected according to different usage occasions, for example, lead free or lead containing tin solder is adopted. In consideration of environment protection, the lead free solder is preferred and is specifically a tin-silver alloy solder comprising between 95 and 96.5 wt. % of tin and between 3.5 and 5 wt. % of silver, a tin-silver-copper solder (96.5 wt. % of Sn, 3 wt. % of Ag, and 0.5 wt. % of Cu), or an alloy solder comprising tin and one or several selected from antimony, bismuth, indium, nickel, or zinc. Tin is a substrate of a lead-free solder, and a content thereof generally accounts for more than 90 wt. % of the alloy solder. The above solders can be purchased from the market.

After the formation of the molten solder in the solder bath, the dynamic flow of the molten solder is formed from the solder bath. The object to be welded is enabled to contact with the dynamic flow of the molten solder for conducting welding.

The above method can be wave soldering, fountain soldering, or cascade soldering. Specifically, the molten solder is accommodated by the solder bath. A pump is disposed at a bottom part of the solder bath. The pump extracts the molten solder from the bottom of the solder bath and produces a certain pressure to drive the molten solder to flow upwards and pass through one or several nozzles, and the molten solder flows out of the nozzles like a water fall and returns to the inner part of the solder bath. The molten solder flowing out of the nozzle is the dynamic flow of the molten solder.

The object to be welded, such as a printed circuit board assembly (PCBA) moves above the solder bath and crosses the solder bath, and a lower surface of the PCBA is enabled to contact with an upper surface of the dynamic flow of the molten solder. The molten solder wets the surface to be welded of the PCBA, penetrates into a metal coated through hole and a periphery of a leading wire, and produces a welded joint between the PCBA and the leading wire. The above process can be accomplished in a wave soldering machine, a fountain soldering machine, or a cascade soldering machine.

Specifically, a welding temperature of the above soldering method is different according to different solders. In summary, the welding temperature is between 240 and 280° C. Too low the temperature is incapable of effectively melting the solder and therefore affects the welding quality; while too high the temperature increases energy consumption and affect the reliability of electronic components and PCB. In this invention, the welding temperature is only required to enable the solder to be molten.

According to the welding method disclosed in the invention, the focus is that the surface of the molten solder comprises a reduction layer. And the reduction layer comprises a nonionic surfactant, an antioxidant, and ammonium metaphosphate.

The reduction layer is a water-soluble oily liquid which exists in the surface of the molten solder during the welding process and is adapted to decrease a metal surface tension of the molten solder so that the water-soluble oily liquid quickly disperses itself and separates the molten solder from the air in a certain degree (if the amount of the reduction layer is sufficient, the entire surface of the molten solder will be covered and the molten solder is totally separated from the air) and prevents the metal tin in the molten solder from being oxidized by oxygen in the air or from forming dross.

In the meanwhile, the reduction layer can diffuse the structure of the dross and decrease a structure tension thereof, so that the dross is quickly diffused and is transformed from irregular solid state into a dispersed viscous liquid state. The useful metals (such as tin) are immediately reduced and backflow to the solder bath, and continue participating in the effective working process, thereby largely decreasing production of the dross and improving the utilization of the molten solder.

In addition, because the above solder process is not conducted in a sealed environment, so that it inevitably contacts with the oxygen and oxygen exists in the molten solder. One part of oxygen reacts with the metals in the molten solder to produce corresponding metal oxides, that is, the dross; while another part of oxygen exists in the molten solder in a free state; therefore, this part of the oxygen is not stable and continues reacting with the metal in the molten solder. The non-oxidized oxygen continues existing in the molten solder and influences the weldability of the solder during the welding. Furthermore, after formation of the welding point, this part of oxygen also results in defects of the inner part of the welding point, thereby affecting the welding quality. As described in the above, the welding method disclosed in the invention can reduce the metal oxide dross into metals, thereby removing the dross, as well as react with the free state oxygen in the molten solder, thereby largely decreasing the oxygen content of the molten solder and maintaining the oxygen content in the molten solder at 100 ppm below, thereby ensuring the welding quality.

For the above reduction layer, the nonionic surfactant is selected from nonylphenol ethoxylates, polyoxyethylene sorbitan monolaurates, or a mixture thereof, and is preferably the nonylphenol ethoxylates.

The antioxidant is selected from phytic acid, malic acid, citric acid, or a mixture thereof.

In the welding process, the nonionic surfactant, the antioxidant, and ammonium metaphosphate are all required to exist in the reduction layer, but content relation thereof is not strictly required. In order to remove the dross therefrom and to improve the welding quality, the reduction layer preferably comprises between 59 and 80 wt. % of the nonionic surfactant, between 15 and 40 wt. % of the antioxidant, and between 0.5 and 5 wt. % of ammonium metaphosphate.

The reduction layer automatically moves on the surface of the molten solder, and an excellent effect of dross decrease can be reached in conditions that the reduction layer convers a part of the surface of the molten solder.

As an improvement of the above welding method, the reduction layer preferably comprises an accelerator.

The accelerator is selected from aniline, tetrabutylammonium bromide, triethanolamine, ethylene diamine, methylamine, ammonium citrate, ammonium dihydrogen phosphate, or a mixture thereof. When the reduction layer contains the above accelerator, the dross can be further decreased, and the content of the molten solder can be decreased. Preferably, the reduction layer comprises between 0.5 and 5 wt. % of the accelerator.

It has been found by the inventor that when the accelerator is ammonium dihydrogen phosphate and a weight ratio of ammonium metaphosphate to ammonium dihydrogen phosphate is between 2:1 and 5:1, it is more beneficial for removing the dross and decreasing the oxygen content in the molten solder.

The above reduction layer can be formed by adding the reductant composition comprising the above components of the above contents to the solder bath. The components and contents of the formed reduction layer can be viewed as the same as that of the reductant composition.

Accordant to the invention, the above reductant composition is added after the formation of the molten solder, or after a period of the welding, or after the production of the dross.

Because the reductant composition is the water-soluble oily liquid, it can be directly added to the surface of the molten solder to form the reduction layer at the surface of the molten solder.

In the above welding method, the addition of the reductant composition is not specially stipulated but can be adjusted according to the amount of the dross during the practical usage.

Generally, the above method can largely decrease the production of the dross, as well as inhibit the carbonization of the impurities and decrease the oxygen content of the molten solder.

The above reductant composition is prepared as follows:

The antioxidant and a first part of the nonionic surfactant are added to ammonium metaphosphate at the temperature of between 80 and 100° C. and are stirred at a temperature of between 50 and 90° C. for between 10 and 50 min to form a mixture. After that, a second part of the nonionic surfactant is added to the mixture and stirred for between 15 and 50 min.

According to the invention, the above nonionic surfactant is added two times, that is, the first part is added and stirred at the temperature of between 50 and 90° C. for between 10 and 50 min, and then the second part is added and stirred for between 10 and 50 min. Specifically, the preliminary addition of the nonionic surfactant can be varied within a large range. Preferably, a weight ratio of the first part of the nonionic surfactant of the preliminary addition to the second part of the nonionic surface of the secondary addition is 2.5-1:1. The invention adopts twice addition of the nonionic surfactant, so that the stratification of the reductant composition can be avoided and is beneficial for improving the reduction effect of the reductant composition.

In the above preparation method, the addition of different substances can be varied according to the contents of the components in the objective reductant composition, for example, the addition of the nonionic surfactant is between 59 and 80 wt. %, the addition of the antioxidant is between 15 and 40 wt. %, and the addition of ammonium metaphosphate is between 0.5 and 5 wt. %.

When the reductant composition is required to contain the accelerator (such as ammonium dihydrogen phosphate), ammonium metaphosphate is mixed with the accelerator before adding the antioxidant and the nonionic surfactant. When the accelerator is to be added, the addition thereof is between 0.5 and 5 wt. %.

To save the material and to achieve a better economic effect, the welding method disclosed in the invention in practical use further comprises: arranging metal flaps in the solder bath, and ensuring the metal flaps beneath the surface of the molten solder.

As an improvement, a number of the metal flaps is between 3 and 5, and the metal flaps are specifically arranged between 3 and 5 cm beneath the surface of the molten solder.

The above structure is adapted to limit the flowing part of the molten metal within a relatively small region, so that a major part of the liquid surface is in a static state, but the molten metal under the liquid surface can be fully circulated, thereby not affecting the original working of the entire working process. The liquid surface of the molten solder has a small flow, so that the formation of the oxides is decreased, and the usage amount of the reductant composition is decreased in a certain degree.

Also, the welding method further comprises: arranging a screen in the solder bath. The solder bath is in a net-like structure that the dross is able to pass through but the dross isn't. The scree comprises a concave part. The concave part of the screen is disposed in the molten solder, and an edge of the screen is higher than the surface of the molten solder. The dynamic flow of the molten solder returns to the molten solder via the concave part.

Preferably, the edge of the scree is higher than the surface of the molten solder by between 1 and 2 cm.

It has found by the inventor that only the flowing and flying molten solder on the liquid surface of the molten metal is seriously oxidized. The method of the invention can centrally treat the dross and ensure that almost no dross exists on the entire surface of the molten solder by the effect of the reduction layer.

Example 1

27 parts by weight of phytic acid and 35 of nonylphenol ethoxylates are added to 3 parts by weight of ammonium metaphosphate at a temperature of 90° C. and are stirred at a temperature of 70° C. for 30 min to form a mixture. 35 parts by weight of the nonylphenol ethoxylates are added to the mixture and are stirred for 30 min to obtain a reductant composition S1.

A tin-copper alloy solder (comprising 99.3 wt. % of Sn and 0.7 wt. % of Cu) is molten at a temperature of 275° C. in a solder bath of a wave soldering machine. After that, the reductant composition S1 is added to the solder bath to form a reduction layer comprising the above components on a surface of the molten solder. And wave soldering is performed on a printed circuit board.

After 30 min of soldering, the molten solder is collected and used as a testing sample A1.

Example 2

3 parts by weight of ammonium dihydrogen phosphate are added to 3 parts by weight of ammonium metaphosphate at a temperature of 90° C., then 24 parts by weight of phytic acid and 50 parts by weight of nonylphenol ethoxylates are added to form a mixture. The mixture is stirred at a temperature of 70° C. for 40 min. Another 20 parts by weight of the nonylphenol ethoxylates are added and stirred for 40 min to obtain a reductant composition S2.

A tin-copper alloy solder (comprising 99.3 wt. % of Sn and 0.7 wt. % of Cu) is molten at a temperature of 275° C. in a solder bath of a wave soldering machine. After that, the reductant composition S2 is added to the solder bath to form a reduction layer comprising the above components on a surface of the molten solder. And wave soldering is performed on a printed circuit board.

After 30 min of soldering, the molten solder is collected and used as a testing sample A2.

Example 3

15 parts by weight of citric acid and 50 of nonylphenol ethoxylates are added to 5 parts by weight of ammonium metaphosphate at a temperature of 100° C. and are stirred at a temperature of 90° C. for 10 min to form a mixture. 30 parts by weight of the nonylphenol ethoxylates are added to the mixture and are stirred for 15 min to obtain a reductant composition S3.

A tin-copper alloy solder (comprising 99.3 wt. % of Sn and 0.7 wt. % of Cu) is molten at a temperature of 260° C. in a solder bath of a wave soldering machine. After that, the reductant composition S3 is added to the solder bath to form a reduction layer comprising the above components on a surface of the molten solder. And wave soldering is performed on a printed circuit board.

After 30 min of soldering, the molten solder is collected and used as a testing sample A3.

Example 4

40 parts by weight of malic acid and 35 of polyoxyethylene sorbitan monolaurates are added to 1 part by weight of ammonium metaphosphate at a temperature of 80° C. and are stirred at a temperature of 50° C. for 50 min to form a mixture. 24 parts by weight of the polyoxyethylene sorbitan monolaurates are added to the mixture and are stirred for 50 min to obtain a reductant composition S4.

A tin-copper alloy solder (comprising 99.3 wt. % of Sn and 0.7 wt. % of Cu) is molten at a temperature of 260° C. in a solder bath of a wave soldering machine. After that, the reductant composition S4 is added to the solder bath to form a reduction layer comprising the above components on a surface of the molten solder. And wave soldering is performed on a printed circuit board.

After 30 min of soldering, the molten solder is collected and used as a testing sample A4.

Example 5

27 parts by weight of phytic acid and 35 of nonylphenol ethoxylates are added to 8 parts by weight of ammonium metaphosphate at a temperature of 90° C. and are stirred at a temperature of 70° C. for 30 min to form a mixture. 30 parts by weight of the nonylphenol ethoxylates are added to the mixture and are stirred for 30 min to obtain a reductant composition S5.

A tin-copper alloy solder (comprising 99.3 wt. % of Sn and 0.7 wt. % of Cu) is molten at a temperature of 260° C. in a solder bath of a wave soldering machine. After that, the reductant composition S5 is added to the solder bath to form a reduction layer comprising the above components on a surface of the molten solder. And wave soldering is performed on a printed circuit board.

After 30 min of soldering, the molten solder is collected and used as a testing sample A5.

Example 6

1 part by weight of ammonium dihydrogen phosphate is added to 4 parts by weight of ammonium metaphosphate at a temperature of 90° C., then 25 parts by weight of phytic acid and 50 parts by weight of nonylphenol ethoxylates are added to form a mixture. The mixture is stirred at a temperature of 70° C. for 40 min. Another 20 parts by weight of the nonylphenol ethoxylates are added and stirred for 40 min to obtain a reductant composition S6.

A tin-copper alloy solder (comprising 99.3 wt. % of Sn and 0.7 wt. % of Cu) is molten at a temperature of 275° C. in a solder bath of a wave soldering machine. After that, the reductant composition S6 is added to the solder bath to form a reduction layer comprising the above components on a surface of the molten solder. And wave soldering is performed on a printed circuit board.

After 30 min of soldering, the molten solder is collected and used as a testing sample A6.

Example 7

2 parts by weight of ammonium dihydrogen phosphate are added to 4 parts by weight of ammonium metaphosphate at a temperature of 90° C., then 24 parts by weight of phytic acid and 50 parts by weight of nonylphenol ethoxylates are added to form a mixture. The mixture is stirred at a temperature of 70° C. for 40 min. Another 20 parts by weight of the nonylphenol ethoxylates are added and stirred for 40 min to obtain a reductant composition S7.

A tin-copper alloy solder (comprising 99.3 wt. % of Sn and 0.7 wt. % of Cu) is molten at a temperature of 275° C. in a solder bath of a wave soldering machine. After that, the reductant composition S7 is added to the solder bath to form a reduction layer comprising the above components on a surface of the molten solder. And wave soldering is performed on a printed circuit board.

After 30 min of soldering, the molten solder is collected and used as a testing sample A7.

Comparison Example 1

The comparison example is used to comparatively illustrate the welding method disclosed by the invention.

A tin-copper alloy solder (comprising 99.3 wt. % of Sn and 0.7 wt. % of Cu) is molten at a temperature of 275° C. in a solder bath of a wave soldering machine, and wave soldering is performed on a printed circuit board.

After 30 min of soldering, the molten solder is collected and used as a testing sample D1.

Comparison Example 2

The comparison example is used to comparatively illustrate the welding method disclosed by the invention.

The welding method of this example is that same as that in Example 1 except that the welding method of this example does not adopt ammonium metaphosphate.

After 30 min of soldering, the molten solder is collected and used as a testing sample D2.

Performance Test:

A method for testing the oxygen content of the molten solder in the welding processes of Examples 1-7 and comparison examples 1-2 is as follows:

The testing is conducted according to "determination of GB/T 5158.4-2001 total oxygen content of the metal powder reduction—extraction method". And test results are recorded in Table 1.

TABLE 1

| | Oxygen content of molten solders | | | | | | | | |
|---|---|---|---|---|---|---|---|---|---|
| Sample | Example 1 | Example 2 | Example 3 | Example 4 | Example 5 | Example 6 | Example 7 | Comparison example 1 | Comparison example 2 |
| Oxygen content ppm | 4.1 | 3.4 | 4.6 | 4.5 | 5.2 | 3.1 | 3.0 | 6.8 | 6.2 |

It is know from Table 1 (in which, oxygen contents of A1-A7 are 4.1 ppm, 3.4 ppm, 4.6 ppm, 4.5 ppm, 5.2 ppm, 3.1 ppm, and 3.0 ppm, respectively; and copper ion contents of D1-D2 are 6.8 ppm and 6.2 ppm, respectively) that the oxygen content of the molten solder can be significantly decreased using the solder method disclosed in the invention, and the solder quality is largely improved.

It is known from the test results of Example 1 and Comparison example 2 that the welding method disclosed by the invention is adapted to significantly decrease the oxygen content of the molten solder. It is known from the test results of Example 1 and Example 2 that it is beneficial for further decreasing the oxygen content of the molten solder when the reduction layer further comprises ammonium dihydrogen phosphate as the accelerator. It is known from the test results of Example 1 and Example 5 that it is beneficial for further decreasing the oxygen content of the molten solder when ammonium metaphosphate is controlled within a preferable range of the invention. Besides, it is known from the test results of Example 2, Example 6, and Example 7 that it is beneficial for further decreasing the oxygen content when a weight ratio of ammonium metaphosphate to ammonium dihydrogen phosphate is between 2:1 and 5:1.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A soldering method, comprising:
   1) forming a molten solder in a solder bath;
   2) forming a dynamic flow of the molten solder from the solder bath; and
   3) contacting an object to be soldered with the dynamic flow of the molten solder;
   wherein:
   a surface of the molten solder comprises a reduction layer;
   an oxygen content of the molten solder is below 10 ppm;
   the reduction layer comprises a nonionic surfactant, an antioxidant, and ammonium metaphosphate;
   the nonionic surfactant is selected from nonylphenol ethoxylates, polyoxyethylene sorbitan monolaurates, or a mixture thereof;
   the antioxidant is selected from phytic acid, malic acid, citric acid, or a mixture thereof; and
   the reduction layer comprises between 59 and 80 wt. % of the nonionic surfactant, between 15 and 40 wt. % of the antioxidant, and between 0.5 and 5 wt. % of ammonium metaphosphate.

2. The method of claim 1, wherein a soldering temperature is between 240 and 280° C.

3. The method of claim 1, wherein the reduction layer further comprises an accelerator.

4. The method of claim 3, wherein
   the accelerator is selected from aniline, tetrabutylammonium bromide, triethanolamine, ethylene diamine, methylamine, ammonium citrate, ammonium dihydrogen phosphate, or a mixture thereof; and
   the reduction layer comprises between 0.5 and 5 wt. % of the accelerator.

5. A soldering method, comprising:
   1) forming a molten solder in a solder bath;
   2) forming a dynamic flow of the molten solder from the solder bath; and
   3) contacting an object to be soldered with the dynamic flow of the molten solder;
   wherein:
   a surface of the molten solder comprises a reduction layer;
   an oxygen content of the molten solder is below 10 ppm;
   the reduction layer comprises a nonionic surfactant, an antioxidant, and ammonium metaphosphate;
   the reduction layer further comprises an accelerator;
   the reduction layer comprises between 0.5 and 5 wt. % of the accelerator;
   the accelerator is ammonium dihydrogen phosphate; and
   a weight ratio of ammonium metaphosphate to ammonium dihydrogen phosphate is between 2:1 and 5:1.

6. The method of claim 4, wherein
   the accelerator is ammonium dihydrogen phosphate; and
   a weight ratio of ammonium metaphosphate to ammonium dihydrogen phosphate is between 2:1 and 5:1.

* * * * *